March 26, 1963 E. J. MELLEN, JR., ET AL 3,082,737
DUSTING APPARATUS
Filed March 17, 1960 2 Sheets-Sheet 1

INVENTORS
Edward J. Mellen Jr.
Robert J. deFasselle
John M. Webb
BY McCoy, Greene & Grotenhuis
ATTORNEYS United States Patent Office 3,082,737
Patented Mar. 26, 1963

3,082,737
DUSTING APPARATUS
Edward J. Mellen, Jr., East Cleveland, Robert J. de Fasselle, Gates Mills, and John M. Webb, Chagrin Falls, Ohio; said Fasselle and said Webb assignors to said Mellen
Filed Mar. 17, 1960, Ser. No. 15,689
3 Claims. (Cl. 118—309)

The present invention relates to a dusting apparatus for use in the production of shell molds.

Shell molds are formed by dipping a destructible pattern in a refractory slurry, drying the refractory materials on the patterns, repeating the process to build up a suitable thickness of mold, then destroying or removing the pattern, and finally firing the mold. A thin-walled mold is thus built up from a multiplicity of layers of refractory materials deposited from refractory slurries. The pattern may be wax or a plastic such as polystyrene.

Under certain circumstances and conditions, it has been found advisable to dust the coatings of refractory materials, while still wet, with a dry refractory material mixture. This builds up the thickness of the shell mold more rapidly and improves its physical characteristics.

The object of the present invention is to provide a suitable apparatus for dusting shell molds with mixtures of refractory materials.

Other objects and advantages will become apparent from the following description of the invention and the accompanying drawings in which like numerals relate to like parts.

Figure 1:
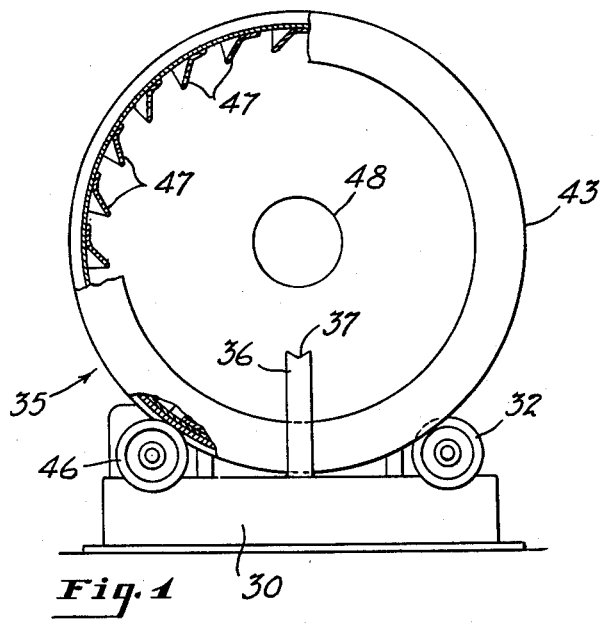
FIGURE 1 is a front elevational view, with parts broken away, of a dusting apparatus of the present invention.
Figure 3:
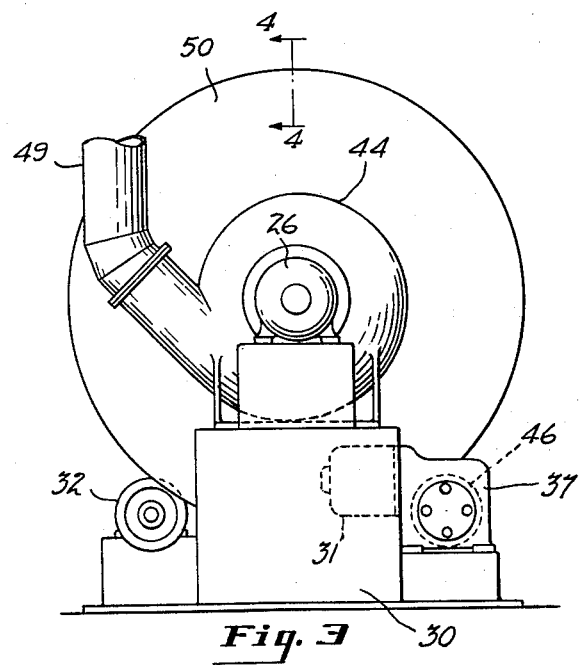
FIGURE 3 is a fragmentary rear elevational view of the dusting apparatus of FIGURE 1.
Figure 2:
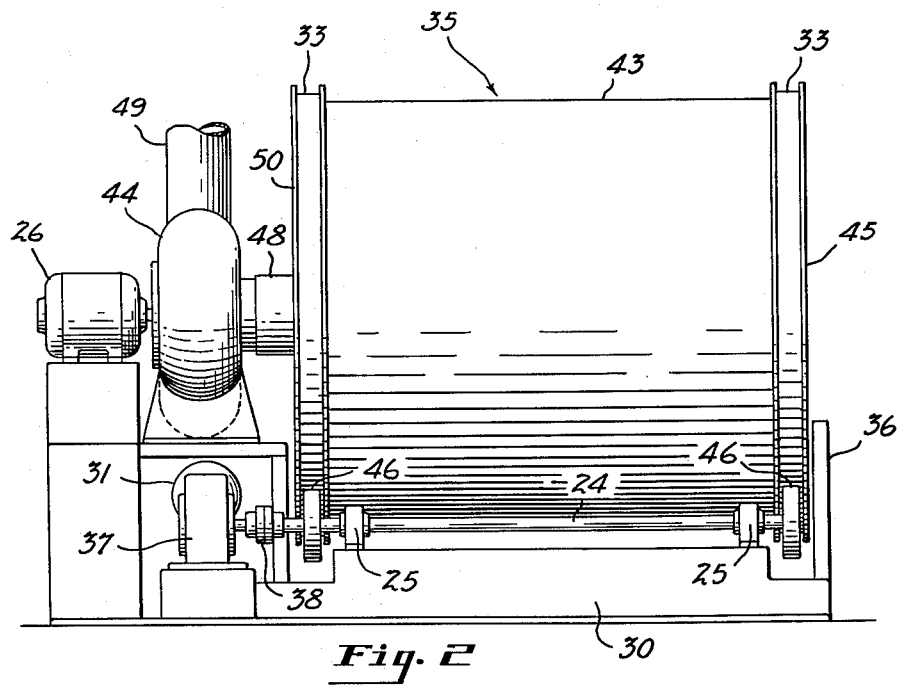
FIGURE 2 is a fragmentary side elevational view of the apparatus of FIGURE 1.

As shown in FIGS. 1, 2 and 3, the dusting apparatus 35 of the present invention comprises a drum or cylinder 43 mounted on a pair of spaced-apart rollers 46 and 32 so that the axis A—A about which the drum rotates is substantially horizontal. The rollers run in spaced channels 33 formed on the outer circumference of the drum. Rollers 46 are mounted on a shaft 24 which is in turn mounted on journal bearings 25 on frame 30. Motor 31 and speed reduction unit 37 are connected to shaft 24 and provide the means to drive or rotate the same. A coupling 38 in the drive shaft smoothes out the rotation of the drum and protects the speed reduction unit 37. The outer circumferences of rollers 46 and 32 are preferably made of rubber to enable the drum 43 to be driven through a friction drive by rollers 46. Rollers 32 are idler rollers. The drum is rotated in the order of 3 to 10 revolutions per minute. As should be apparent to a skilled mechanic, other suitable means may be used to mount the drum for rotation in a substantially horizontal plane and rotate the same.

Figure 4:
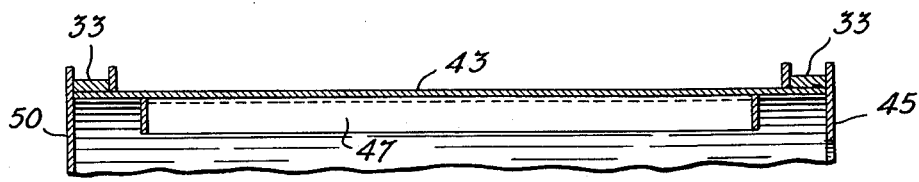
FIGURE 4 is a fragmentary sectional view of a portion of the apparatus taken along the line 4—4 of FIGURE 3 and shows one of the buckets of the apparatus.

Mounted about the inner circumference of the drum is a series of buckets or scoops 47 adapted to pick up or scoop up refractory particles at the bottom of the drum and discharge them by gravity at the top of the drum. This provides a continuous shower of refractory particles when the drum rotates. The buckets load throughout the bottom of the cycle and discharge throughout the top of the cycle, the portion of the cycle over which they discharge being dependent upon the angle which the buckets make with the inner circumference of the drum and the speed of rotation of the drum. The buckets should preferably be aligned with the axis of rotation of the drum and extend about 80% of the length of the drum, stopping short on both ends as shown in FIGURE 4 of the drawings. If desired, however, they may be constructed so that the discharge of refractory particles is concentrated in a particular area or areas.

The buckets all open in the same direction and have their faces formed or opening into planes substantially parallel to the radii of the drum. The number of buckets used depends upon the size of the drum. Enough buckets should be used to have one empty promptly after the other and provide a continuous shower of refractory particles.

One end of the drum is provided with an opening connecting to a conduit 48 which is integral with the drum. By means of a suitable slip-fit seal, conduit 48 is connected to the inlet end of suction fan 44 driven by motor 26.

When the drum is rotated, refractory particles are collected at the bottom of the drum by buckets 47 and released by the force of gravity when the buckets reach the top position. This provides a continuous shower of refractory particles inside of the drum. Wet molds are dusted by inserting them into the open end of the drum 45 and rotating them slowly by hand or otherwise. A support 36 is provided to facilitate manipulation of the mold or cluster while it is being dusted. The mold hook rests on notch 37 of support 36. By the use of the apparatus of the present invention, the mold is dusted in about a half-minute or less.

The dust or fines from the refractory particles are sucked out of the drum through conduit 48 by suction fan 44. They are carried by means of conduit 49 into a header conduit and from there into a cyclone where the fines are removed from the air stream by filtering means and collected. This arrangement is illustrated in FIGURE 1 of our patent application Serial No. 742,554 filed June 17, 1958, now U.S. Patent No. 2,932,864.

In the dusting apparatus of the present invention, the suction fan performs a dual function. It removes the fines or small refractory particles from the dusting mixture so that the mixture does not change in composition between refillings. It also draws air and fines into the dusting apparatus so that clouds of fines dust are not emitted from its open end, thereby making it impossible for a person to work.

In the apparatus shown, one end 45 of the drum is open so that the molds may be readily inserted therein and the other end 50 is preferably but not necessarily sealed off. The drum may have a length at least as long as its diameter as shown in FIGURE 2.

The apparatus of the present invention may be adapted for continuous or non-manual operation by having a mold conveyor carry the molds through the center portion of a drum similar to that shown. In such a case, each end of the drum would be open and a suction fan of suitable capacity would be located at each end to draw out the fines. The conveyor would continuously convey the molds through the drum while it rotated.

The general type of pattern cluster or mold which is dusted in the apparatus of the present invention is illustrated in FIG. 6 of the above patent. Other patents showing the same general type of shell molds are Patents Nos. 2,400,831 and 2,912,729.

This application is a continuation-in-part of application Serial No. 742,554 filed June 17, 1958, now U.S. Patent No. 2,932,864 patented April 19, 1960.

Having thus described our invention, what we claim is:

1. An apparatus for dusting particles of refractory materials over wet ceramic molds comprising a drum mounted for rotation about a substantially horizontal axis and having two circular and parallel ends, means to rotate said drum, a plurality of buckets disposed about the inner circumference of the drum to collect refractory particles at the bottom of the drum and discharge them by gravity at the top of the drum as the drum is rotated, each of said buckets being independent of the other and being parallel to the axis of rotation of said drum, each of said buckets ending short of each of said two circular and parallel ends which are perpendicular to the axis of rotation of the drum, and a suction fan at at least one end of said drum to withdraw the fines and dust particles in the atmosphere of the drum and prevent them from discharging into the atmosphere surrounding the drum.

2. An apparatus for dusting particles of refractory materials over a wet ceramic mold layer comprising a frame, a pair of spaced-apart parallel rollers mounted on the frame, a drum disposed on said rollers with its axis of rotation in a substantially horizontal plane and having two circular and parallel ends, said drum having a length at least as long as its diameter and a large opening in one end for easy insertion of ceramic molds for dusting thereof and a small opening in the other end, a suction fan at the opening opposite from the large opening, means to rotate said drum, a plurality of buckets attached to and spaced substantially uniformly around the inner circumference of the drum, each of said buckets being independent of each other and being parallel to the axis of rotation of said drum, each of said buckets ending short of each of said two circular and parallel ends which are perpendicular to the axis of rotation of the drum, said buckets opening in a direction substantially parallel to the radii of the drum so that said buckets pick up refractory particles when the buckets are on the bottom of the drum close to the rollers and empty out by gravity when the drum revolves and the buckets are at the top of the drum to provide a uniform, dense cloud of falling refractory particles throughout the interior of said drum, said buckets being spaced from the axis of rotation of said drum so that the refractory particles have enough fall to penetrate the surface of the wet ceramic mold and achieve a mechanical bond therewith.

3. An apparatus for dusting particles of refractory materials over wet ceramic molds comprising a drum open at one end and mounted for rotation about a substantially horizontal axis, said drum having two circular and parallel ends, means to rotate said drum, a plurality of scoops disposed about the inner surface of the drum to collect refractory particles therein as the drum rotates and discharge them by gravity at the top of the drum whereby these particles rain down upon any object placed in said drum, each of said scoops being independent of each other and being parallel to the axis of rotation of said drum, each of said scoops ending short of each of said two circular and parallel ends which are perpendicular to the axis of rotation of the drum, a stand having a V-shaped upper end and adjacent the open end of the drum upon which a ceramic mold assembly may be rested during the dusting operation, and a suction fan at the opposite end of the drum to withdraw the fines and dust particles from the atmosphere of the drum.

References Cited in the file of this patent
UNITED STATES PATENTS

| | | |
|---|---|---|
| 1,876,224 | Harding | Sept. 6, 1932 |
| 2,577,433 | Robb | Dec. 4, 1951 |
| 2,736,288 | Clay et al. | Feb. 28, 1956 |